US012585438B1

(12) United States Patent
Sanevelly et al.

(10) Patent No.: US 12,585,438 B1
(45) Date of Patent: Mar. 24, 2026

(54) SYSTEM AND METHOD FOR WEB-APPLICATION IMPLEMENTATION

(71) Applicant: Elevance Health, Inc., Indianapolis, IN (US)

(72) Inventors: Raja Sanevelly, Cumming, GA (US); Sam Kyatham, Alpharetta, GA (US); Omkaram Sangem, Cumming, GA (US)

(73) Assignee: Elevance Health, Inc., Indianapolis, IN (US)

( * ) Notice: Subject to any disclaimer, the term of this patent is extended or adjusted under 35 U.S.C. 154(b) by 630 days.

(21) Appl. No.: 17/854,971

(22) Filed: Jun. 30, 2022

Related U.S. Application Data

(60) Provisional application No. 63/216,689, filed on Jun. 30, 2021.

(51) Int. Cl.
*G06F 8/34* (2018.01)

(52) U.S. Cl.
CPC .................................... *G06F 8/34* (2013.01)

(58) Field of Classification Search
CPC .................................... G06F 8/34; G06F 8/65
See application file for complete search history.

(56) References Cited

U.S. PATENT DOCUMENTS

| | | | | |
|---|---|---|---|---|
| 9,235,407 | B1 * | 1/2016 | Ye | G06F 8/656 |
| 10,587,729 | B1 * | 3/2020 | Jain | G06F 3/0481 |
| 11,150,895 | B1 * | 10/2021 | Wall | G06F 8/65 |
| 2013/0054418 | A1 * | 2/2013 | Yang | H04W 4/50 705/26.1 |
| 2017/0060562 | A1 * | 3/2017 | Lopez | G06F 8/60 |
| 2017/0094024 | A1 * | 3/2017 | Braudes | G06F 8/61 |
| 2021/0117165 | A1 * | 4/2021 | Stang | G06F 8/71 |
| 2021/0344636 | A1 * | 11/2021 | Martin | G06F 40/30 |
| 2021/0344739 | A1 * | 11/2021 | Kalva | G06F 8/40 |

FOREIGN PATENT DOCUMENTS

CN         109032662 A   * 12/2018   ............... G06F 8/73

* cited by examiner

*Primary Examiner* — Noor Alkhateeb
(74) *Attorney, Agent, or Firm* — Morgan, Lewis & Bockius LLP

(57) ABSTRACT

A method for shell-based web application implementation, comprising hosting, at an application build module, a developer user interface accessible by third party developer computing devices to reconfigure a shell-based web application, receiving, at the application build module, from third party developer computing devices, application configuration data required to reconfigure the respective shell-based web application, transmitting, by the application build module, the application configuration data to an application renderer module of the application host module, automatically generating, at the application renderer module, web application source code using the application configuration data received from the application build module without manual input of source code from third party developer computing devices, reconfiguring, at the application renderer module, the respective shell-based web application without redeploying the respective shell-based web application using, the generated web application source code, and native source code of the shell-based web application.

15 Claims, 13 Drawing Sheets

100

110

160        170

150

180

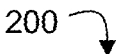

200

202 — Login

204 — Create Questionnaire/Form

List from Question Bank

Text Box

Text Area

Checkbox

Checkbox Group

Radio Button

206 — Add Form Elements/Question from List

Typical Form Elements from UI

Drop down

Signature

Table

Import from external spreadsheets

Display

Group

More elements ? — Yes

210

212

208 — Create Branching Rules

Create Scoring Configu

Apply General Rules

218 — Publish to target application

Email form to SMEs if needed

Preview Form

216

214

Form is live in target application

Branching Rule(s)

Branching rules allow you to customize the flow of form/questionnaire.

You can show or hide additional form inputs/questions, or even show or hide group of form elements/questions.

Publish Forms in to target environment

Once forms config is built in EAB, it can be published to selective target application environments.

SYSTEM AND METHOD FOR WEB-APPLICATION IMPLEMENTATION

CROSS-REFERENCE TO RELATED APPLICATIONS

This application claims the benefit of U.S. Provisional Application No. 63/216,689, filed Jun. 30, 2021, entitled "System and Method for Web-Application Implementation," which is incorporated by reference herein in its entirety.

TECHNICAL FIELD

The present disclosure relates to computer applications, and in particular, to an implementation methodology for web-applications.

BACKGROUND

Many businesses are reliant on web applications (sometimes referred to as "web apps") for daily business processes including data gathering. Web applications often require frequent changes to the underlying logic of what is displayed on the web app, as underlying requirements change. As one example, if a web application includes forms or questionnaires, the requirements for the information gathering purpose of the form may change frequently over time. As requirements change, it becomes difficult for businesses that rely on information gathered by web apps to get the apps updated quickly by coding professionals, who are in limited supply and high demand. This acute need for timely revision of web application is especially evident with customer/consumer facing web applications. Time needed for application changes to be deployed is very high and makes it hard to maintain service levels often required in service level agreements.

For example, every time a new requirement comes in, e.g. for information gathering via web forms, people who create or learn of the requirements would need to transfer the requirements to development teams to turn those requirements into code, test and then deploy. Often, things go wrong in the coding process, changes may need be roll-backed and the development activity may need to be repeated to get the changes live for users of the application. Major issues in this model include: cost and high turnaround time to deliver business requirements into solutions.

SUMMARY

In some aspects, there is provided a method for shell-based web application implementation, comprising: at one or more servers: while an application host module executes and hosts one or more shell-based web applications accessible by third party client computing devices: hosting, at an application build module, a developer user interface, receiving, at an application build module, from third party developer computing devices, application configuration data required to reconfigure a respective shell-based web application; transmitting, by the application build module, the application configuration data to the application renderer module; generating web application source code using the application configuration data received from the application build module; reconfiguring, at the application renderer module, the respective shell-based web application without redeploying the respective shell-based web application using: the web application source code generated by the application build module, and the shell-based web application native source code.

A method for shell-based web application implementation is disclosed. The method comprises, at one or more servers, while an application host module executes and hosts a shell-based web application accessible by third party client computing devices, hosting, at an application build module, a developer user interface accessible by third party developer computing devices to reconfigure the shell-based web application wherein the application build module is operating on a separate and distinct web server from the application host module, receiving, at the application build module, from third party developer computing devices, application configuration data required to reconfigure the shell-based web application; transmitting, by the application build module, the application configuration data to an application renderer module of the application host module; automatically generating, at the application renderer module, web application source code using the application configuration data received from the application build module, without manual input of source code from third party developer computing devices; and reconfiguring, at the application renderer module, the respective shell-based web application without redeploying the respective shell-based web application using: the generated web application source code, and native source code of the shell-based web application.

In some embodiments, transmitting the application configuration data to the application renderer module includes converting the application configuration data into a key-value pair format. In some embodiments, application configuration data include web module definition, web module fields, web module rules, and publishing attributes, received from the third party developer computing devices via the developer user interface. In some embodiments, web module rules include branching rules, scoring configuration, and general module rules. In some embodiments, branching rules include generating a web module expression defining an action to be performed on a respective web module element based on an input received at the shell-based web application from a respective third party client computing device. In some embodiments, branching rules include generating a web module expression defining an action to be performed on a respective web module element based on existing third party data relating to the third party client computing device. In some embodiments, the scoring configuration is a scoring rubric for scoring user inputs to the web module for further processing. In some embodiments, the web module rules include defining an action to be performed on a respective web module element based on a result of the scoring rubric. In some embodiments, the general module rules include one or more actions to perform on one or more components of the web module based on certain criteria. In some embodiments, the publishing attributes include target web application name, environment information, and effective date range.

In some embodiments, the method further comprises, before transmitting the application configuration data to the application renderer module, generating an application preview user interface, transmitting the application preview user interface to the third party developer computing devices, and receiving verification from the third party developer computing devices. In some embodiments, generating web application source code using the application configuration data includes the web module definition, web module elements, web module rules, and publishing attributes, received from the third party developer computing devices via the developer user interface. In some embodiments, the respective shell-based web application is selected based on the publishing attributes received from the third party developer computing devices via the developer user interface. In some embodiments, the method further comprises storing the application configuration data for the respective shell-based web application and applying a portion of the application data to a second shell-based application based on a command received from the third party developer computing devices via the developer user interface.

A system for shell-based web application implementation is disclosed. In one embodiment, the system comprises an application host module server, configured to execute and host a shell-based web application accessible by third party client computing devices, the application host module server comprising an application renderer module; an application build module server, separate and distinct from the application host module server, the application build module server configured to, while the application host module server executes and hosts the shell-based web application: host a developer user interface accessible by third party developer computing devices to reconfigure the shell-based web application, receive, from third party developer computing devices, application configuration data required to reconfigure the shell-based web application; and transmit the application configuration data to the application renderer module. The application renderer module may be configured to: automatically generate web application source code using the application configuration data received from the application build module without manual input of source code from third party developer computing devices; and reconfigure the respective shell-based web application without redeploying the respective shell-based web application using: the generated web application source code, and native source code of the shell-based web application.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIG. 2 is a method for web-application implementation in accordance with some embodiments.

Figure 1:
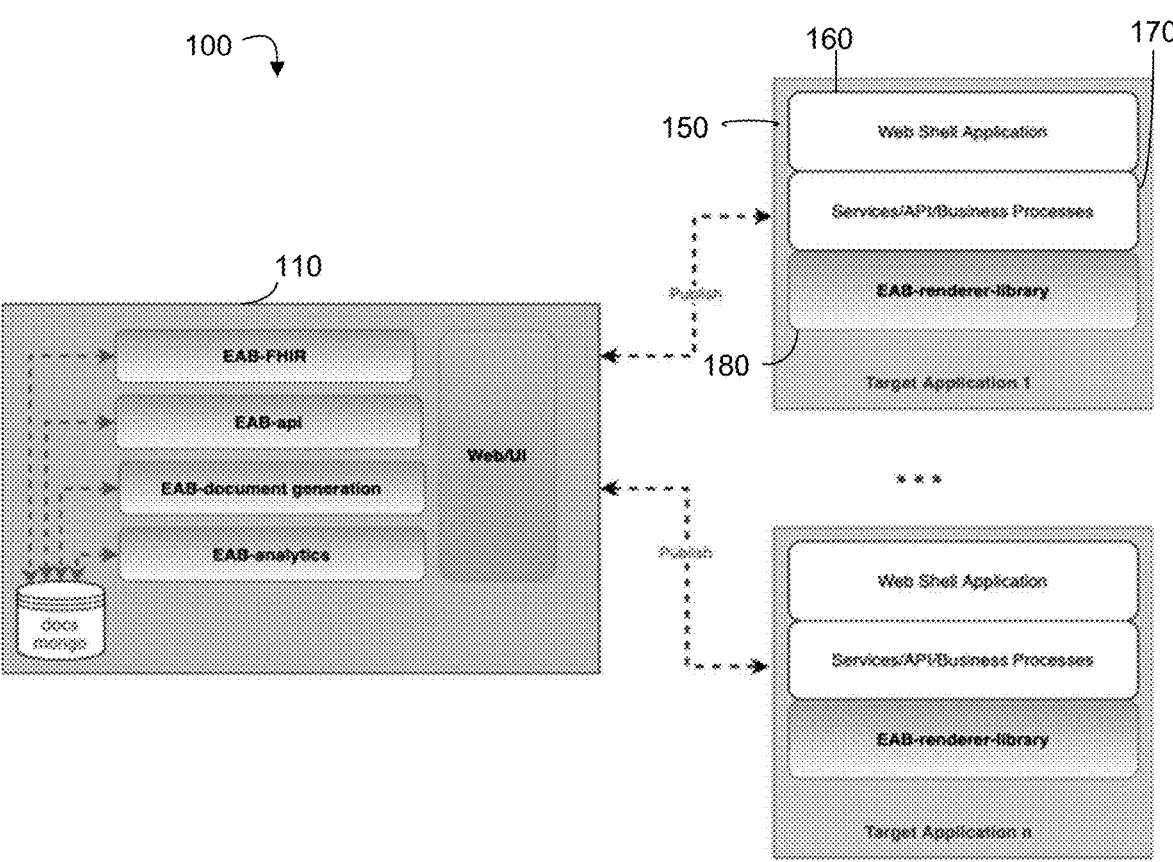
FIG. 1 is a functional block diagram of a system for web-application implementation in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals are used to denote like features throughout the specification and figures.

DETAILED DESCRIPTION

Contrary to conventional software models, some embodiments of the present disclosure allow for users without software development skills to develop a shell-based web application with a renderer library and go live with minimum required features. In some embodiments, even while the application is deployed, features/forms/pages/rules can be configured and pushed to the live environments. As requirements change, business users are able to configure those requirements into forms and make them live as well. In these embodiments, there may be no development, zero coding, and no downtime. The process for these embodiments can be quite simpler, more robust and less error-prone than traditional development. Revert back, reconfigure and republish functionality can be extremely quick as well. In some embodiments, a version for every change that goes into production may be maintained so that it can be modified and deployed in a future version of the application. Another aspect of at least some embodiments is reusability, including of configuration forms. Forms may be broken down into elements, which can be reusable across forms. Form elements may be added into an Item/Question Bank as described below, and then imported into specific forms while the configuration is built. In one aspect of the present disclosure, the system may support building the configuration from external files containing the underlying logic, such as spreadsheets or specially formatted csv files.

Some implementations described herein focus on solving such problems identified herein with a configure-verify-publish approach.

Some implementations include building the forms/questionnaires, defining rules, defining workflows and rendering the forms in to targeted web applications with a single click. New code and traditional deployments are not required to view changes in targeted web application when the system of the present disclosure is used. Some implementations follow the pattern of a progressive web application where a shell-based application running in real-time is provided and then other aspects are added/controlled on top of it as requirements are changed with configurable web forms/pages along with the rules by utilizing aspects described herein.

As described in further detail herein, some aspects of the present disclosure may include conditional forms/Questionnaires creation with rules and form actions. In some aspects of the present disclosure, a non-developer user may be able to preview and publish into configured environments. In some embodiments, forms may be emailed to subject matter experts to get verified before they are published to the application. In some embodiments, as described in further detail below, an advanced rendering library may be provided. An advanced rendering library may be included in a web application to make the application a progressive application. In one aspect, the system of the present disclosure may include highly customizeable, real time data integrations and may also include sophisticated application programming interface (API) based solutions.

Highly customizable, real-time data integrations and sophisticated application programming interface (API) based solutions.

Standards based.

Some implementations primarily focus in solving recurring form/web elements/rules/workflows around the forms. Some implementations allow businesses to create/update reusable forms, preview changes and publish into production in one single user action.

Some implementations particularly solve problems described herein, by including functionality such as:

Create questionnaires and publish them into different platforms/applications with effective date. Zero coding/no restarts/no deployments, out of the box forms will show to the user in target application based on effective date configured.

Create configuration for dynamic forms and publish to target environment as and when needed.

Configurable rules to control the flow-branching/generic rules depends on business needs.

Scoring questionnaires based on configuration.

Electronic signed documents generation when user submits the questionnaires/forms.

Data analytical capabilities with variety of charts.

Emailing forms to users and collect responses.

Schedule recurring forms to be emailed so that business can collect feedback/insights in to their business.

Building whole web application with the help of this invention, create forms, configure navigation, add rules, define workflows, visualize/publish into different environments to test prior publishing the application into production ready.

Independent library to show forms based on configuration.

Standards based; metadata is based out of industry standard.

Simple, sleek, robust UI for managing all the above capabilities.

FIG. 1 shows a block diagram that illustrates an exemplary system 100 for implementing web-applications according to at least one aspect of the present invention. While some example features are illustrated, various other features have not been illustrated for the sake of brevity and so as not to obscure pertinent aspects of the example aspects disclosed herein.

The system 100 may include one or more (or N, where N is an integer) target application host modules 150. A respective target application host module 150 may be any computer software application configured to executes and hosts web applications on a web server that is accessible by third party client computing devices. The respective target host module 150 may include a web shell application 160. The web shell application may be software executed on a server that hosts the web application while also enabling remote administration and modification of the web application without redeployment.

The target application host modules 150 may include services, application programming interfaces and/or processes 170 implemented by the target application 150. Services may be functionality offered by the respective target application host module 150. Application programming interfaces may be a system of tools and resources in an operating system, enabling developers to create software applications. Processes may be instances of the target application host module 150 accessible by the third party client computing devices.

The target application host modules 150 may also include an application renderer module 180. The application renderer module 180 may be configured to receive configuration data from an external device and generate native target application source code (e.g., web forms based on w3$c$ standard html) based on the configuration data. The source code may include generating UI code in html/JavaScript/ CSS along with required rules/actions on certain clicks on document object model (DOM) elements. The application renderer module 180 may be configured to act as a library and can be included in web-based applications. In some implementations, there is a clear separation between keeping configuration data separate while generating user interface (UI) code in html/JavaScript/CSS along with required rules/ actions on certain clicks on DOM elements. Since configuration and code generation out from configuration is completely separate, the configuration data can be extended and used in native code that matches with target application expectations. The same builder configuration data can also be published into mobile apps and native code generation to produce UIs needed for target mobile applications.

The system 100 may include an applicable build module 110. The application build module 110 may be configured to facilitate analysts/business users to create web modules (e.g., forms, questionnaires and surveys) and publish the web modules into any targeted web applications to make the web modules available to users without any downtime for deployment. The application build module 110 and application renderer module 180 may be configured to create web modules and publish them into any targeted web applications without requiring developers to write source code and/or require re-deployment of the target applications. This makes the changes available on the fly in real-time to business web applications.

The application build module 110 may be configured to receive/obtain/collect the required metadata/configuration data for a web module. The configuration data may be transmitted to the application renderer module 180 by converting the configuration data into a key-value pair format. The application build module 110 may be configured to include a database (docs-mongo) configured to store metadata/configuration data about the web modules. In some implementations, the generated configuration data assumes specialized expressions that are target application agnostic.

The application build module 110 may include an API module (EAB-FHIR) configured to provide an API for business resources such as include Questionnaire and QuestionnaireResponse.

The application build module 110 may include an API module (EAB-API) configured to restful services outside of those provided by the API module (EAB-FHIR).

The application build module 110 may include a document generation module (EAB-document-generation) configured to generate electronic documents (e.g., PDFs) on the server-side.

The application build module 110 may include an analytics module (EAB-analytics) configured to generate and provide charts showing various data insights.

The application build module 110 may include a Web-UI module utilized by third party developer computing devices. The Web-UI module may include a web based developer user interface to interact with UI. Developers can log in and configure web modules and publish in to selected target applications.

Some embodiments may provide advantages that come from the concept of treating aspects of a web application as a configuration. Some advantages include providing lists of web modules such as forms/pages/navigation/rules/text etc., maintaining configuration/version data of the web modules and reuse the web modules whenever needed. The configuration stored for the web modules helps to bootstrap the web application in minutes if not seconds as soon as configuration is pushed to respective target environment. These advantages can solve some real world problems-developing and application with manual steps by the developer with prolonged time lines, deployment steps, and pre and post validations. Using at least some aspects of the invention, and in some embodiments, one should be able to capture configuration required for an application, visualize it on top of the tool, get confirmations from SMEs and the make your application's respective application to go live in minutes. At least some aspects of the invention include incremental web application development. As business grows, requirements come up, user should be able to add additional forms/update existing pages/forms in no time with this tool.

Using one or more components of at least some embodiments described herein, the system may be configured to provide:

Configurable forms

Configurable rules

Extensible-highly configurable form types/answer options etc.

Configurable styles, they can be updated to match target application look and feel.

WYSIWYG-What You See Is What You Get Editor-One can easily build forms, preview them/email them/publish in to lower environment before making them available to production environment.

FIG. 2 is a flow diagram illustrating an exemplary method 200 for shell-based web application implementation referencing components of system 100 shown in FIG. 1. It is contemplated that one or more steps of method 200 may be performed by different components in alternative embodiments.

In some embodiments, initially, a target application host module 150 may execute and host one or more shell-based web applications accessible by third party client computing devices.

At step 202, an application build module 110 may host a developer user interface. The developer user interface is a web-based application utilized by developers to design web module and specify certain attributes, components and/or features for the web modules hosted on the target application. Examples of sub-interfaces that may be included with developer user interface are shown in FIGS. 6A-6H. Further detail regarding such sub-interfaces are described in more detail herein. A third party developer computing device may log in to the developer user interface to access and design the web modules.

At steps 204-206, application build module 110 may receive application configuration data from a respective third party developer computing device (e.g., via the developer user interface). The application configuration data may be used to reconfigure the respective shell-based web application and any web modules therein.

A request from third party developer computing devices may include web module definition, web module elements, web module rules, and/or publishing attributes, received from the third party developer computing devices via the developer user interface.

The web module definition may include module name or other metadata about the web module.

The web module elements may identify a unique web element of the web module. Examples of elements in applications include buttons, text boxes, and images, among others. Web elements may be dependent upon the markup language used to develop the web module. For example, a respective web element may correspond to a unique document object model (DOM) or hypertext markup language (HTML) element identifier (e.g. xpath, id, name, linktext).

Web module rules correspond to one or more rules to be performed by the target application in response to certain conditions being satisfied. In some embodiments, the web module rule may be a branching rule that performs a function/action on the web module in response to a user input at the web module. A branching rule may, for example, show or hide a web field in response to a user action on the web module. For example, a web field for identifying a primary caregiver may appear if a user identifies themselves as a minor in a preceding field. In some embodiments, the web module rule may be a scoring configuration configured to calculate a score for user inputs supplied to a web module and then optionally, perform a subsequent function based on the score. In some embodiments, the general module rules may be configured to apply general business rules to the web module based on certain user inputs. In some embodiments, publishing attributes may specify information about when and where the web module is implemented.

Publishing attributes may include a respective target web application name, environment information (e.g., production, testing), and effective date range (e.g., a start date, end date). Selecting a respective target web application to publish the web module, the environment information and/or the time when the module will be displayed may be based on the publishing attributes received from the third party developer computing devices via the developer user interface.

In some embodiments, application configuration data may be received from a list from question bank and/or an import from an external spreadsheet.

Figure 3:
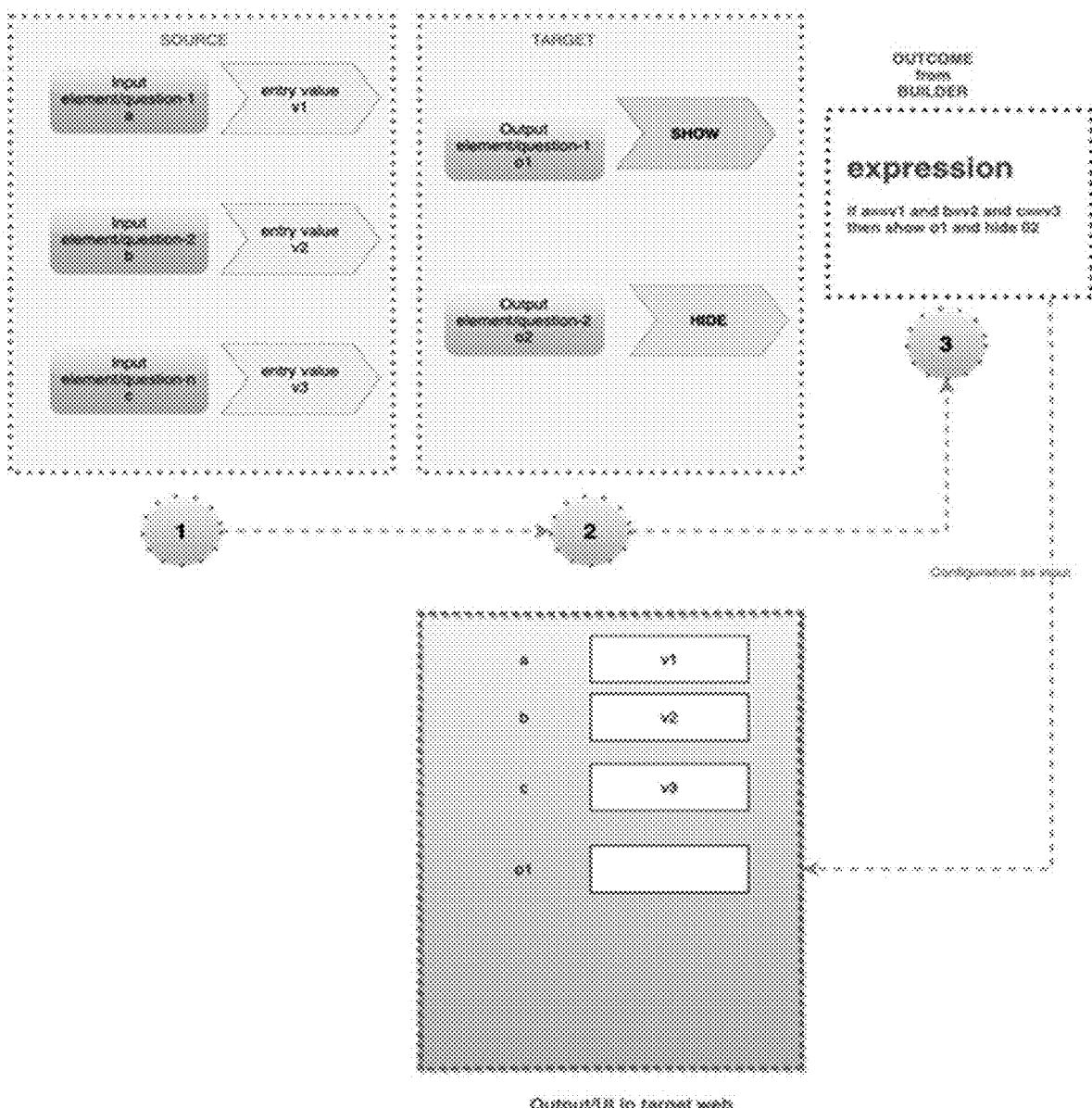
FIG. 3 is a conceptual representation of branching rules implementation in accordance with some embodiments.

At step 208, the application build module 110 may create branching rules that are added to the web application source code based on the configuration data. In some embodiments, the application build module 110 may generate a web module expression based on the configuration data that defines an action to be performed on a respective web module element based on an input received at the shell-based web application from a respective third party client computing device. For example, as shown in FIG. 3, the configuration data may include source element/value information, target element/value information and expression information. Using the source element information, target element information and expression information, the application build module 110 may generate an expression (e.g., if/then statement) to represent the branching rule. In the example shown in FIG. 3, if an input a at a first web module element equals an entry value v1, input b at a second web module element equals an entry value v2 and input c at a third web module element equals an entry value v3, then web module element 01 is shown while and web module element 02 is hidden. The expression may be stored in the configuration data for later use by the application renderer module 180.

At step 210, the application build module 110 may create a scoring configuration. The scoring configuration may define how to calculate a score for user inputs supplied to a web module and then optionally, perform a subsequent function based on the score.

At step 212, the application build module 110 may apply general module rules to the configuration data. In some embodiments, the general module rules may be configured to apply general business rules to the web module based on certain user inputs.

Figure 5:
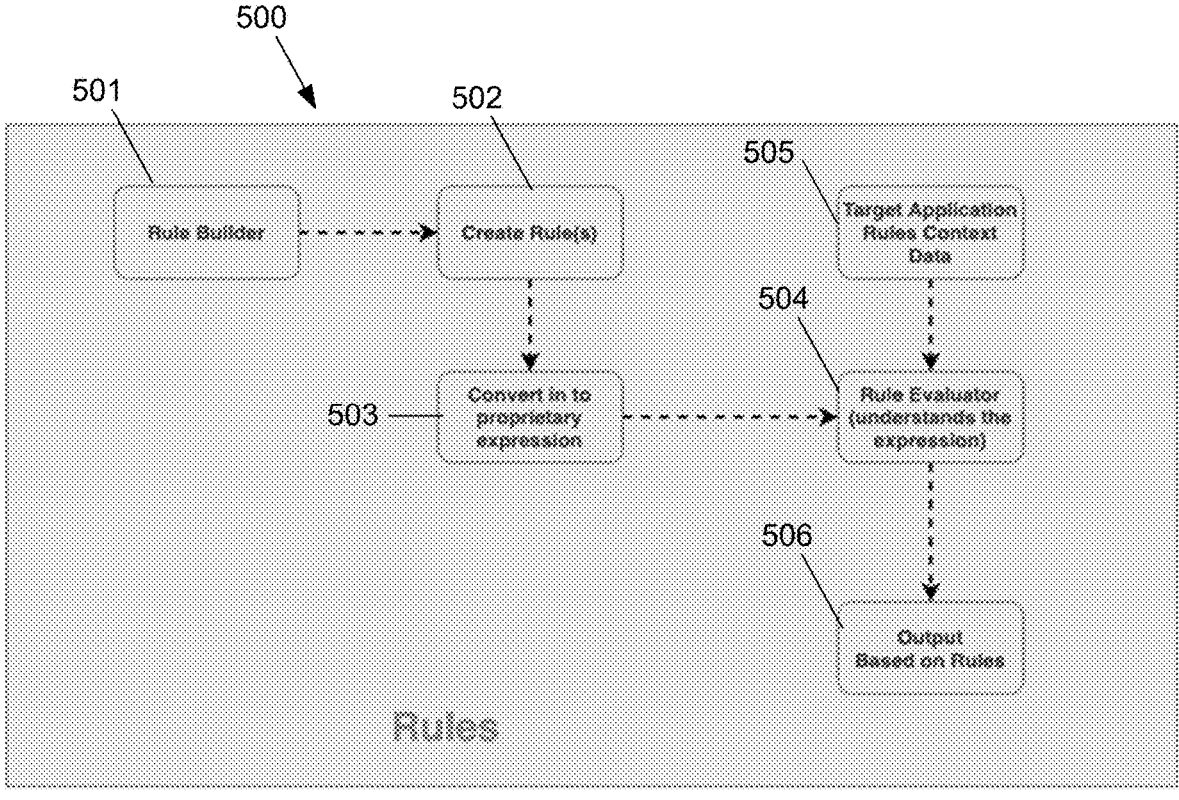
FIG. 5 is a conceptual representation of rules implementation in accordance with some embodiments.

An exemplary rule build and implementation approach 500 is shown in FIG. 5. In some embodiments, a rule builder module 501 may enable a user to create rules (502) without writing source code to implement them. As discussed herein in reference to FIG. 6D, the rule builder may take the form of a graphical user interface which may include certain user interface elements such as a rule builder dashboard, where a user can create new rules or re-use previously created rules. In some embodiments, rules may relate to user geography, demography, etc. Once a rule is ready to be published, it may then be converted (503) to an expression of the logic of the rule. In some embodiments this is a proprietary expression. Once the rule has been translated from the graphical representation of the rule to the rule represented as an expression, the expression may be passed to a Rule evaluator 504 which may be configured to interpret the expression. Rule evaluator 504 may also have as an input a set of target application rules context data 505. The target application is the application in which the updated form using the newly created rule, will be published. Target Application Rules Context Data may include information relating to what kind of rules may be acceptable in the particular target application, or other information relating to the environment of the target application. Rule evaluator 504 then takes the rule in expression form, and the target rules context data, and outputs (506) the rule in a format that allows it to be published in the target application.

At step 214, the application build module 110 may preview a web module to a user of the developer interface. In some embodiments, the application build module 110 may generate an application preview user interface, transmit the application preview user interface to the third party developer computing devices, and receive verification from the third party developer computing devices. Example of a web module preview is shown in FIG. 6H.

At step 216, the application build module 110 may transmit the web module to a subject matter expert developer via email.

At step 218, application build module 110 may publish the configuration data to the target application based on the publishing configuration data (e.g., publishing attributes). In some embodiments, application build module 110 may transmit the application configuration data to the application renderer module 180. In some embodiments, the configuration data may be transmitted in a key-value pair format. Publishing configuration data (e.g., attributes) may include a respective target web application name, environment information (e.g., production, testing), and effective date range (e.g., a start date, end date). Selecting a respective target web application to publish the web module, the environment information and/or the time when the module will be displayed may be based on the publishing attributes received from the third party developer computing devices via the developer user interface.

Figure 4:
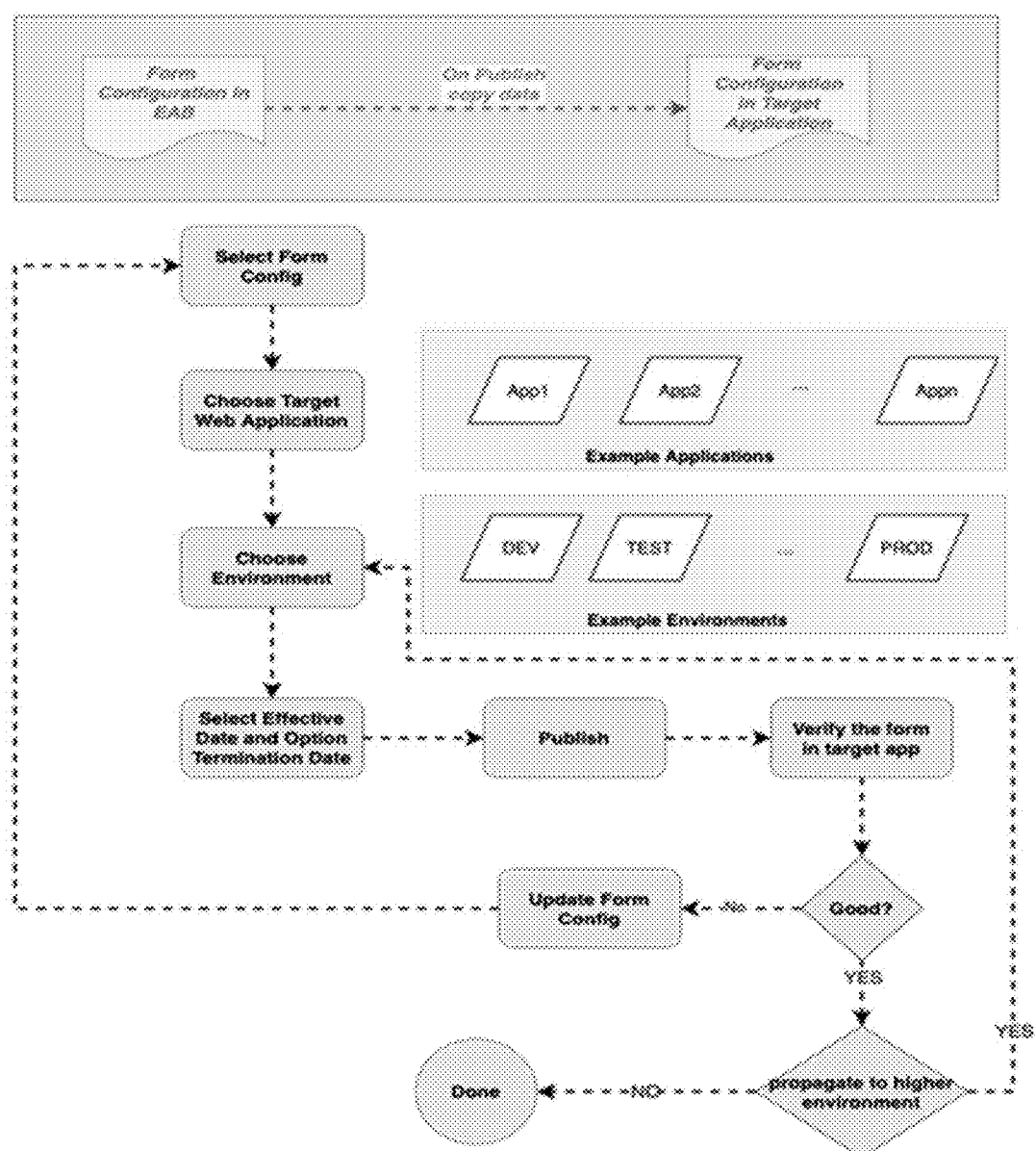
FIG. 4 is a method for publishing configuration in accordance with some embodiments.

Referring now to FIG. 4, there is shown an example of a method of applying publishing configuration data and how it is utilized by the application build module 110 is shown in FIG. 4. The method of applying publishing configuration data as shown in FIG. 4 may in some embodiments be performed as part of step 218 of method 200 of FIG. 2. Initially a form (or web module) configuration is selected by a user developer using the developer interface. A target web application may be selected. Selecting the target web application will apply the web module source code and configuration to the selected target web application. An environment, such as production or test, may be selected. An effective date (or start and/or end date) may be selected. The web module will be enabled during the effective date period. The web module may then be published to the target web application. A verification may be performed to ensure the web module is functioning correctly. If not updates to the application configuration data is performed. If so the web module is propagated to the next higher environment until the production environment is reached.

Referring back to FIG. 2, at step 220, application renderer module 180 may generate web application source code using the application configuration data received from the application build module 110 and implement the web application source code in the shell-based target web application. In some embodiments, application renderer module 180 may be configured to interpret the configuration data, select a portion of source code that corresponds to respective portions of the configuration data and modify the portions of source based on the respective portions of the configuration data. For example, the portion of source code may be a web module, with specific sub-portions of the source code corresponding to different web module elements specified in the configuration data. In some embodiments, the application renderer module 180 (or alternatively application build module 110) may be configured to generate web application source code using the application configuration data including the web module definition, web module elements, web module rules, and publishing attributes, received from the third party developer computing devices via the developer user interface.

In some embodiments, application renderer module 180 may be configured to reconfigure the respective shell-based web application 160 without redeploying the respective shell-based web application using: the web application source code, and the shell-based web application native source code. For example, application renderer module 180 may utilize a renderer library that can process the standard configuration metadata and render the required forms of the shell-based web application 160 as well as rules collected in metadata. The renderer library may be a part of the shell-based web application 160 and responsible to read metadata and update the user interface. Thus, no deployment may be needed to view forms dynamically in the shell-based web application 160.

In some embodiments, the application build module 110 may store the application configuration data for the respective shell-based web application and apply a portion of the application data to a second shell-based application based on a command received from the third party developer computing devices via the developer user interface.

FIGS. 6A-6H show exemplary user interfaces according to different implementations of some embodiments the invention.

Figure 6A:
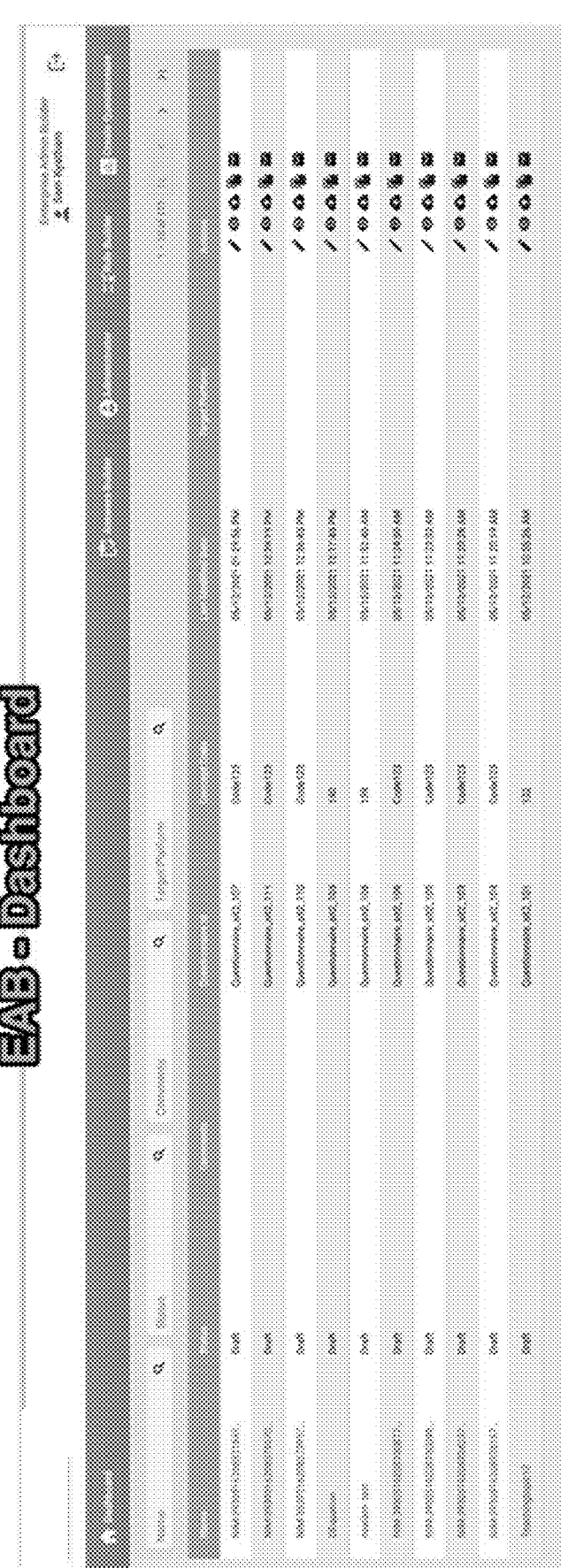
FIGS. 6A-6H show exemplary user interfaces according to at least some embodiments of the invention.

FIG. 6A shows an exemplary user interface of the repository of the web modules. This interface is commonly known as a Dashboard. Here, the user can see a list of questionnaires that the user has created over time. In some embodiments a user is shown the status of the questionnaire (e.g. draft, active, inactive), a unique identifier (here called a "concept code") for the questionnaire, and interface elements whereby the user may choose to interact with any questionnaire in various ways, including by editing or modifying it, or by creating a copy of it and then modifying the copy.

Figure 6B:
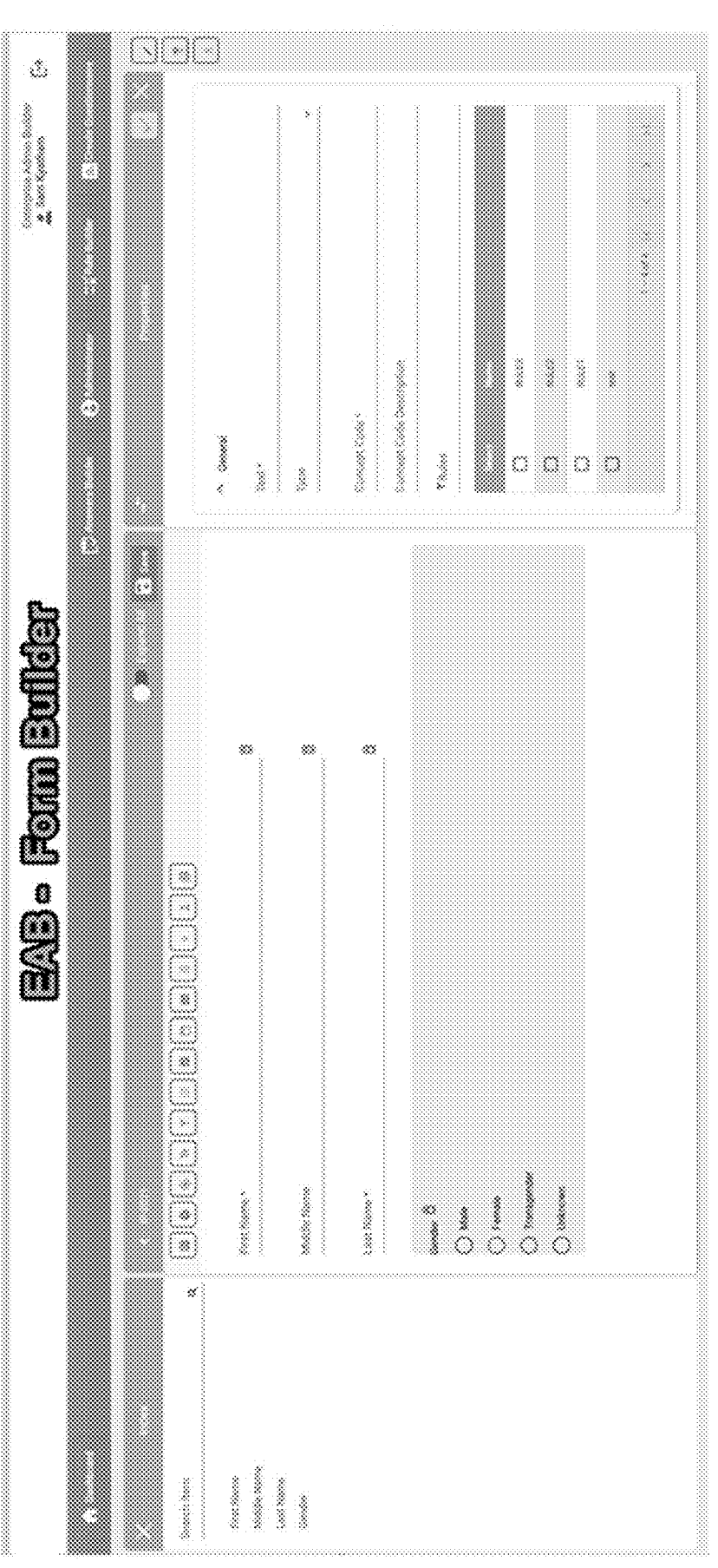

FIG. 6B shows an exemplary user interface of the form builder functionality provided via the developer user interface. Forms may be built by users via the form builder interface. The interface begins with form selection icons 200, wherein users may choose different kinds of forms to build. Once the user has selected a type of form, the user may then add elements to the form and also optionally preview the form. Users may add questions to their form, and add elements to questions, such as radio buttons, tables, or rich text. Some of the formatting options may also determine how the form may accept answers, e.g. multiple choices with one choice allowed, multiple choice with many choices allowed, or free text. The user may also introduce logic into the form, which can add or omit questions, or ask different questions, either based on information about the form or the form filler, which may come from previously known information or from answers to previous questions.

Figure 6C:
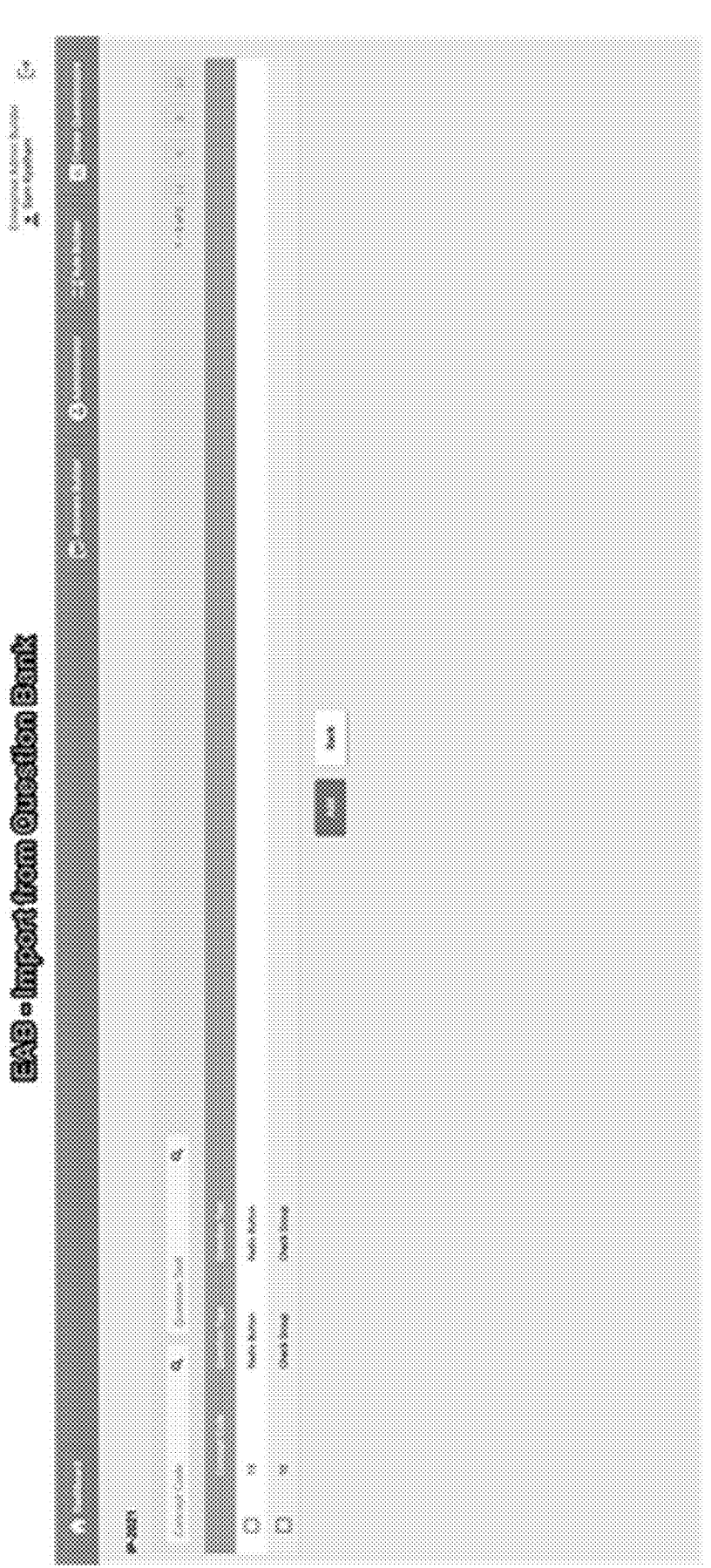

FIG. 6C shows an exemplary user interface for importing components of existing web modules when developing new web modules. Users may elect to re-use questions from prior forms that they had previously created. Users may also use this interface to choose questions to save that they might want to reuse later. This interface shown in FIG. 6C is to save individual questions, as opposed to the dashboard interface of FIG. 6A, which is to save past drafts of entire forms.

Figure 6D:
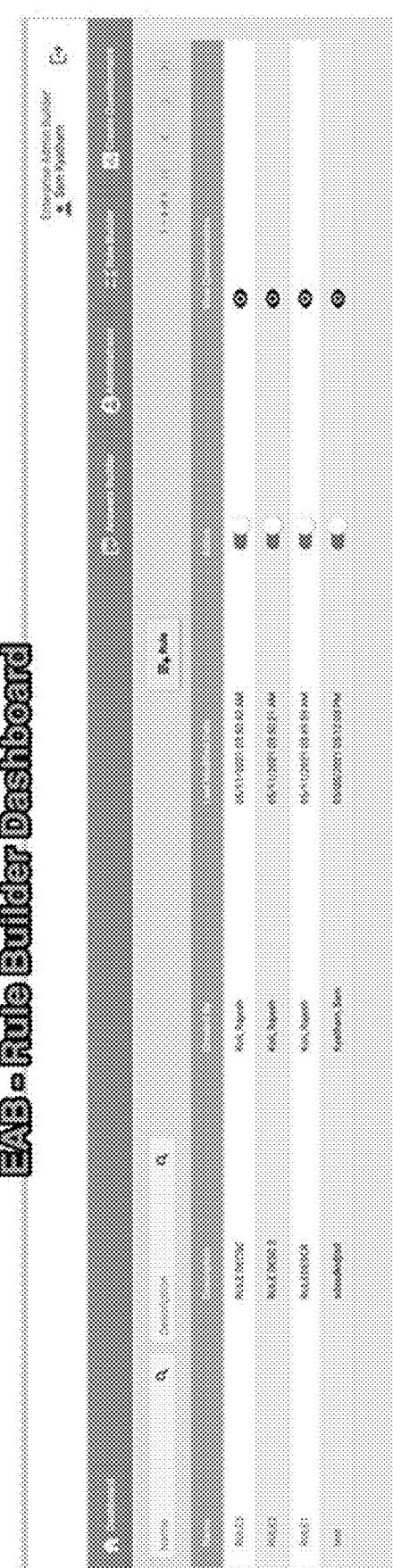

FIG. 6D is an exemplary user interface of a rule builder dashboard in accordance with an embodiment of the present disclosure. Rules are pieces of logic that can be used to trigger certain questions, form elements, or entire forms, based on data such as user identity or demographic information, or answers to other questions. They are normally built by writing code, but in this Rule Builder dashboard they may instead be built using a graphical user interface. In some embodiments rules are fully configurable. A user may add a rule by clicking the +Rule button. Rules can be added at either the form level (e.g. whether to display an entire form) or the item level. Once a rule is saved in the Rule Builder Dashboard, it may be used and re-used across different forms. Frequently used rules may include rules based on user geography, demography, etc. In some embodiments, a user interface element such as the element appearing as an eye icon, may show a preview of the rule, e.g. as it may appear in a form.

Figure 6E:
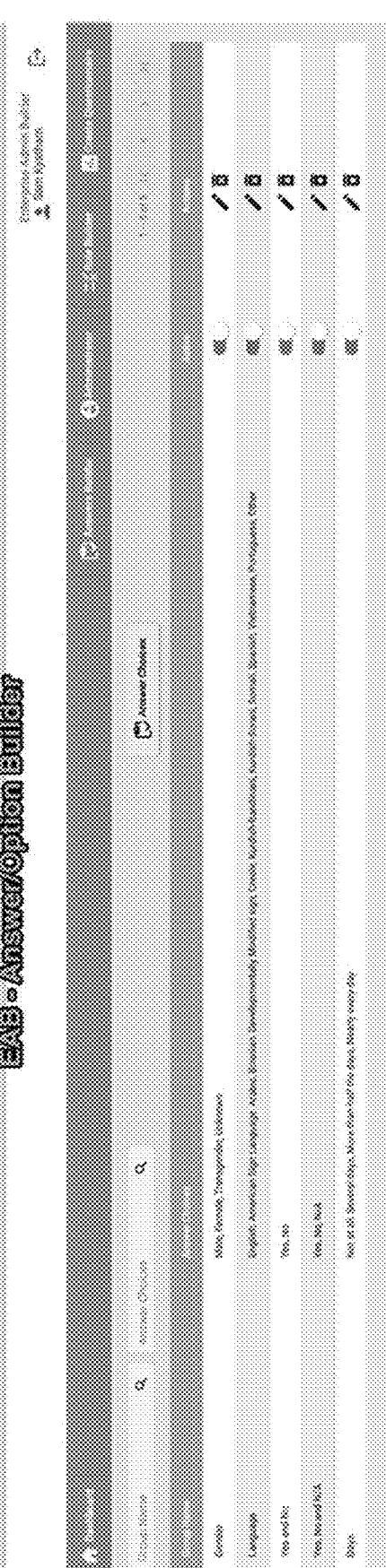

In FIG. 6E an example of a user interface for an answer/option builder is shown. Here, the user can store common or frequently reused sets of answers, e.g. to commonly asked questions. This allowed users to more easily build a form question by reusing a set of answers from a previous question. Sets of answers might be useful in form building even in unrelated questions. As shown in FIG. 6E, reusable answers can include sets of yes/no answers, sets of answers about how often something occurs. Building these answers in advance will allow the user to reuse them to build forms without writing code.

Figure 6F:
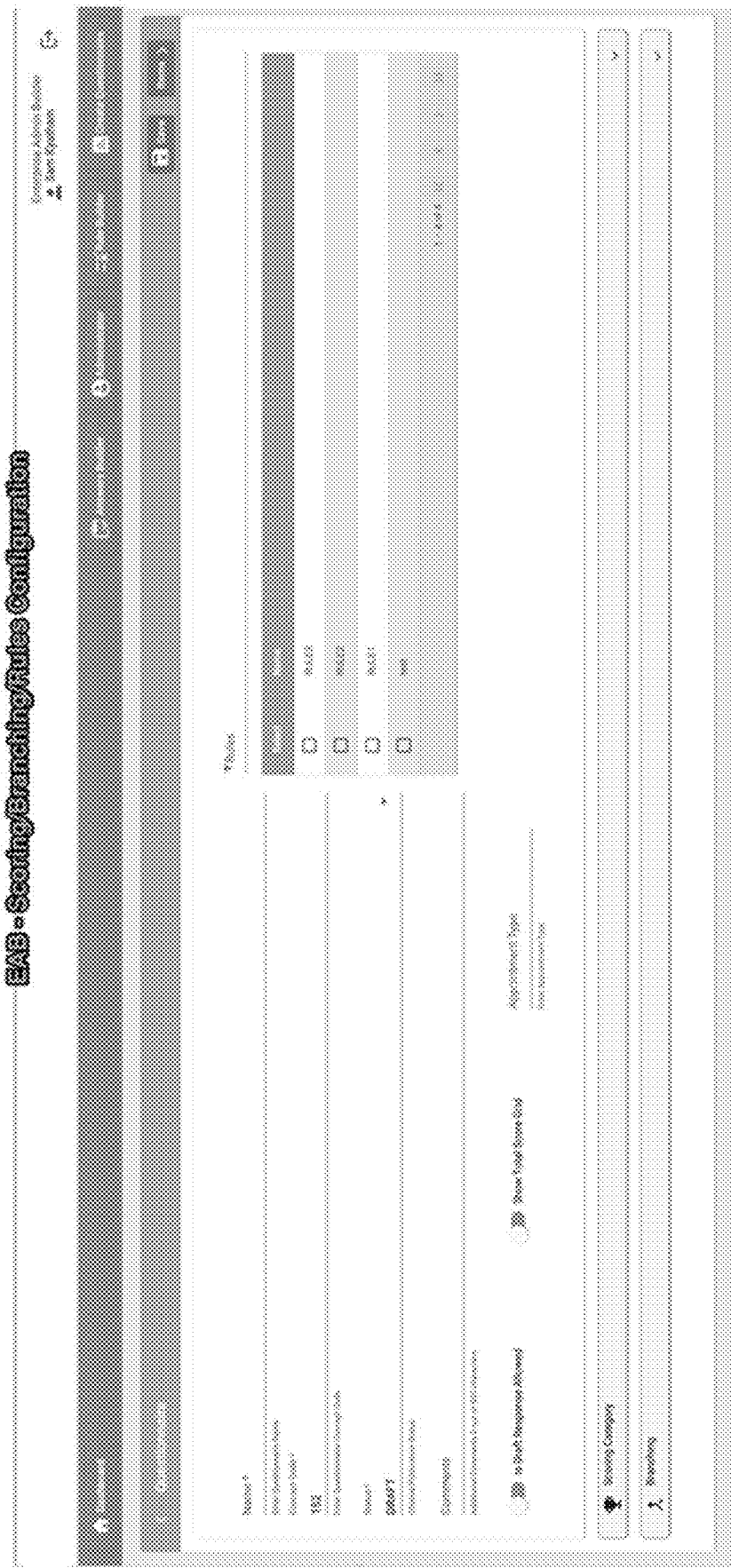

FIG. 6F shows an exemplary user interface for a web module for scoring/branching and general rules configurations. Branching rules are known in the area of coding. However, an embodiment of the present disclosure allows users who are unable to code or are unfamiliar with coding to implement branching rules via a graphic user interface. Examples of branching rules may include launching different subforms or sets of questions, on the basis of answers to earlier questions. Users can create their own if, then, else logic, graphically, without having to write code. For example, the user can write the form to ask Question 3 if the answer to Question 1 is yes, but as Question 2 if the answer to Question 1 is no. In some embodiments, branching rules can be triggered by scoring. In this embodiment, different answers to different questions may be assigned a point value. A certain number of points, e.g. a total across multiple questions, may trigger a branching rule that leads the form filler to a different set of questions. Scoring may also include arithmetic operations other than addition, relating to certain questions, and may involve performing the mathematical operations on numerical answers input in response to questions. In one example, a form may calculate Body Mass Index (BMI) based on the user's answers to height and weight questions, and may then apply a branching rule based on the calculated BMI.

Figure 6G:
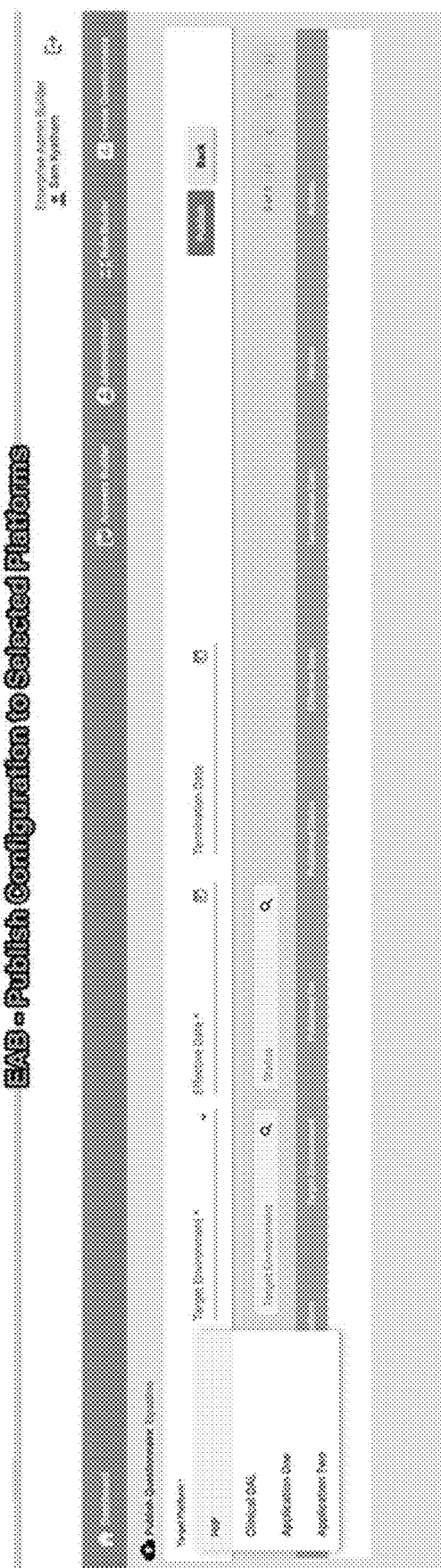
Figure 6H:
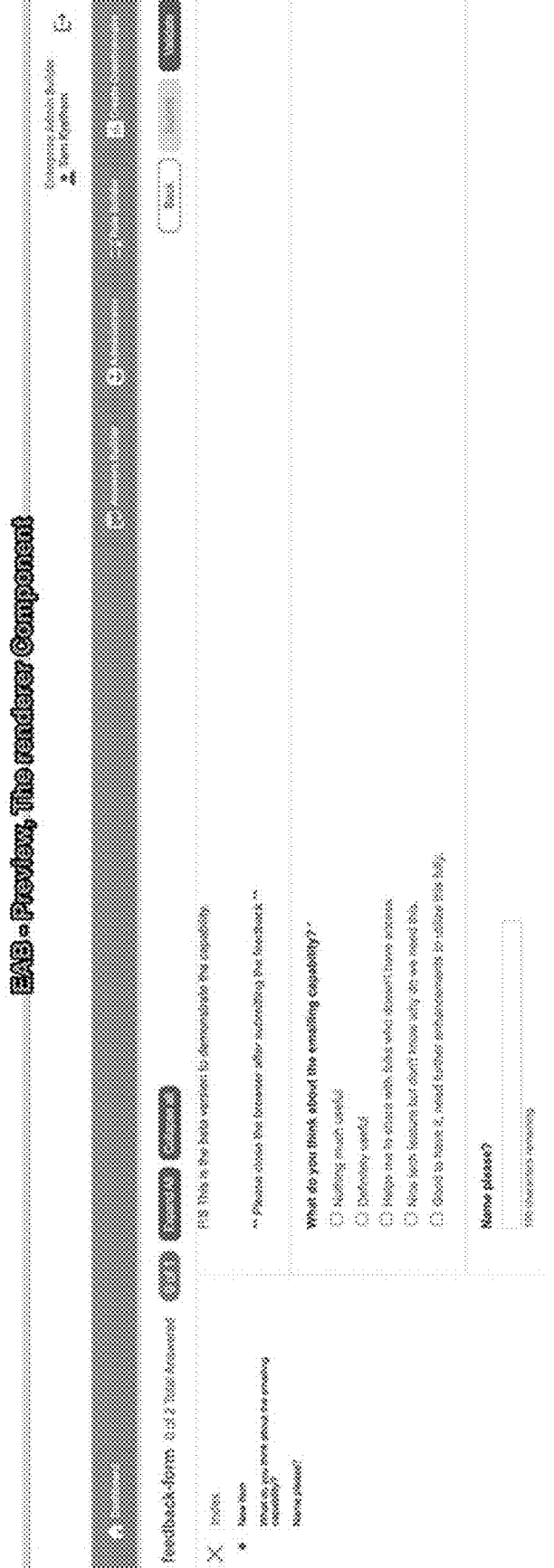

FIG. 6G shows an exemplary user interface for defining publishing configuration data for a web module. In this user interface, the user can choose to publish the form the user created, after it is completed. The form can be published to one or more target environments, which may include web applications, environments, mobile applications, etc. The publication interface also allows web and mobile applications to be updated with new forms and questionnaires without the need to write or compile code.

FIG. 6H shows an exemplary preview user interface, where a user may preview the form that has been built. Users can view parts of the form or use the "expand all" interface items to view the entire form.

In some embodiments, the system 100 may be enhanced to support various other use cases where target application expects much more fine-grained functionalities.

In some embodiments, the system 100 may be configured to build forms with text/voice commands. For example, business users/analysts can build configuration by simply chatting/sending text commands/voice commands to a chatbot and in response to the chat, the system 100 builds required form elements.

In some embodiments, the system 100 may include auto UI/UX capabilities. For example, the system 100 can advise users what makes to use for specific form based on industry trends.

In some embodiments, the system 100 may include a complete workflow engine. Workflow can be enhanced to capture much more complex use cases and it can be published to target applications without any downtime.

In some embodiments, the system 100 may be configured to perform real-time reporting on how the forms are utilized.

As detailed herein, web application without any development and deployment literally saves money and time for any organization. Primarily it also assists in reducing time to market the products and make them available to end users very quickly. Some embodiments not only solve the high turnaround time to market the solutions but also provides consistence look and feel and user experience since it is systematically generated by the renderer module of system 100. Configure the form once and publish to multiple web applications reduces maintenance overhead.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention, different components as opposed to those specifically mentioned may perform at least some of the features described herein, and features of the disclosed embodiments may be combined. As used herein, the terms "about" and "approximately" may refer to + or − 10% of the value referenced. For example, "about 9" is understood to encompass 8.2 and 9.9.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

It will be understood that, although the terms "first," "second," etc. are sometimes used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the "first element" are renamed consistently and all occurrences of the second element are renamed consistently. The first element and the second element are both elements, but they are not the same element.

As used herein, the term "if" may be, optionally, construed to mean "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

It will be further understood that the terms "comprises" and/or "comprising," when used in this specification, specify the presence of stated features, integers, operations, elements, and/or components, but do not preclude the presence or addition of one or more other features, integers, operations, elements, components, and/or groups thereof.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A method for shell-based web application implementation, comprising:

while an application host module executes and hosts a shell-based web application accessible by third party client computing devices:

hosting, at an application build module, a developer user interface accessible by third party developer computing devices to reconfigure the shell-based web application wherein the application build module is operating on a separate and distinct web server from the application host module, receiving, at the application build module, from the third party developer computing devices, application configuration data required to reconfigure the shell-based web application;

transmitting, by the application build module, the application configuration data to an application renderer module of the application host module;

automatically generating, at the application renderer module, web application source code using the application configuration data received from the application build module, without manual input of source code from third party developer computing devices; and reconfiguring, at the application renderer module, the shell-based web application without redeploying the shell-based web application using:

(i) the generated web application source code, and (ii) native source code of the shell-based web application, wherein the method further comprises:

interpreting, at the application renderer module, the application configuration data;

selecting, at the application renderer module, a portion of source code that corresponds to respective portions of the application configuration data; and modifying the selected portion of the source code based on the respective portions of the application configuration data.

2. The method of claim 1, wherein transmitting the application configuration data to the application renderer module includes converting the application configuration data into a key-value pair format.

3. The method of claim 2, wherein application configuration data include:

web module definition, web module fields, web module rules, and publishing attributes, received from the third party developer computing devices via the developer user interface.

4. The method of claim 3, wherein web module rules include branching rules, scoring configuration, and general module rules.

5. The method of claim 4, wherein branching rules include: generating a web module expression defining an action to be performed on a respective web module element based on an input received at the shell-based web application from a respective third party client computing device.

6. The method of claim 4, wherein branching rules include: generating a web module expression defining an action to be performed on a respective web module element based on existing third party data relating to the third party client computing device.

7. The method of claim 4, wherein the scoring configuration is a scoring rubric for scoring user inputs to a web module for further processing.

8. The method of claim 7, wherein the web module rules include defining an action to be performed on a respective web module element based on a result of the scoring rubric.

9. The method of claim 4, wherein the general module rules include one or more actions to perform on one or more components of a web module based on certain criteria.

10. The method of claim 3, wherein the publishing attributes include target web application name, environment information, and effective date range.

11. The method of claim 1, further comprising, before transmitting the application configuration data to the application renderer module:

generating an application preview user interface, transmitting the application preview user interface to the third party developer computing devices, and receiving verification from the third party developer computing devices.

12. The method of claim 11, including generating web application source code using the application configuration data that comprises web module definition, web module elements, web module rules, and publishing attributes, received from the third party developer computing devices via the developer user interface.

13. The method of claim 12, wherein the shell-based web application is selected based on the publishing attributes received from the third party developer computing devices via the developer user interface.

14. The method of claim 13, further comprising storing the application configuration data for the shell-based web application and applying a portion of the application configuration data to a second shell-based application based on a command received from the third party developer computing devices via the developer user interface.

15. A system for shell-based web application implementation, comprising:

an application host module server storing instructions for executing and hosting a shell-based web application accessible by third party client computing devices, the application host module server comprising an application renderer module; and an application build module server, separate and distinct from the application host module server, the application build module server storing instructions for, while the application host module server executes and hosts the shell-based web application:

hosting a developer user interface accessible by third party developer computing devices to reconfigure the shell-based web application, receiving, from the third party developer computing devices, application configuration data required to reconfigure the shell-based web application; and transmitting the application configuration data to the application renderer module;

the application renderer module storing instructions for:

automatically generating web application source code using the application configuration data received from the application build module without manual input of source code from third party developer computing devices;

reconfiguring the shell-based web application without redeploying the shell-based web application using:

(i) the generated web application source code, and (ii) native source code of the shell-based web application;

interpreting, at the application renderer module, the application configuration data;

selecting, at the application renderer module, a portion of source code that corresponds to respective portions of the application configuration data; and modifying the selected portion of the source code based on the respective portions of the application configuration data.

\* \* \* \* \*